(12) United States Patent
Abe

(10) Patent No.: US 7,837,228 B2
(45) Date of Patent: Nov. 23, 2010

(54) AIRBAG AND AIRBAG DEVICE

(75) Inventor: Kazuhiro Abe, Tokyo (JP)

(73) Assignee: Takata Corporation, Tokyo (JP)

( * ) Notice: Subject to any disclaimer, the term of this patent is extended or adjusted under 35 U.S.C. 154(b) by 138 days.

(21) Appl. No.: 12/227,178

(22) PCT Filed: Jul. 10, 2007

(86) PCT No.: PCT/JP2007/063720

§ 371 (c)(1),
(2), (4) Date: Nov. 10, 2008

(87) PCT Pub. No.: WO2008/026384

PCT Pub. Date: Mar. 6, 2008

(65) Prior Publication Data

US 2009/0206587 A1      Aug. 20, 2009

(30) Foreign Application Priority Data

Sep. 1, 2006      (JP)      ............................. 2006-237868

(51) Int. Cl.
*B60R 21/16* (2006.01)
(52) U.S. Cl. ................................................. 280/743.1
(58) Field of Classification Search ............. 280/743.1, 280/736, 740, 741, 743.2
See application file for complete search history.

(56) References Cited

U.S. PATENT DOCUMENTS

| 5,871,231 | A | 2/1999 | Richards et al. | |
|---|---|---|---|---|
| 6,086,096 | A * | 7/2000 | Link et al. | 280/743.2 |
| 6,676,158 | B2 * | 1/2004 | Ishikawa | 280/743.1 |
| 7,401,811 | B2 * | 7/2008 | Nagai et al. | 280/743.1 |
| 7,481,456 | B2 * | 1/2009 | Nozaki et al. | 280/743.1 |
| 2002/0067032 | A1 * | 6/2002 | Ishikawa | 280/743.1 |

(Continued)

FOREIGN PATENT DOCUMENTS

DE      196 40 322 A1      3/1998

(Continued)

OTHER PUBLICATIONS

Supplementary European Search Report issued European Patent Office dated Aug. 20, 2009 for European Patent Application No. 07790538.8.

*Primary Examiner*—Faye M. Fleming
(74) *Attorney, Agent, or Firm*—Foley & Lardner LLP

(57) ABSTRACT

An airbag and an airbag device, a vent hole of which remains closed or is made open to a small extent until the internal pressure of the airbag becomes equal or more than predetermined, and becomes opened or is made open to a large extent when the internal pressure of the airbag becomes equal or more than predetermined and also when an occupant comes in contact with the airbag. A vent hole 18 is provided to a rear panel 14 of an airbag 10, and is covered with a cover member 60 from the inside of the airbag 10. A hanging rope 80 connecting a front panel 12 and the rear panel 14 in the inside of the airbag 10 is connected to the cover member 60 with a tether 70. On the center side of the airbag 10 with respect to the vent hole 18, the tether 70 is sandwiched between the front panel 12 and the rear panel 14, and these are joined together with line-like joining portions 22, 24 so as to be disengageable.

6 Claims, 10 Drawing Sheets

U.S. PATENT DOCUMENTS

| | | |
|---|---|---|
| 2004/0012180 A1 | 1/2004 | Hawthorn et al. |
| 2005/0248137 A1 | 11/2005 | Delventhal et al. |
| 2007/0013177 A1* | 1/2007 | Abe .......................... 280/739 |
| 2007/0241546 A1* | 10/2007 | Chida et al. ................ 280/739 |

FOREIGN PATENT DOCUMENTS

| | | |
|---|---|---|
| DE | 10 2004 058 439 B3 | 7/2006 |
| EP | 1 514 743 A1 | 9/2004 |
| JP | 6-127330 | 5/1994 |
| JP | 2000-511848 | 9/2000 |
| JP | 2005-153726 | 6/2005 |
| JP | 2005-199987 | 7/2005 |
| WO | WO 97/46425 | 12/1997 |
| WO | WO 2006/041547 A2 | 4/2006 |
| WO | WO 2006/041552 A2 | 4/2006 |

* cited by examiner

AIRBAG AND AIRBAG DEVICE

TECHNICAL FIELD

The present invention relates to an airbag provided with a vent hole for allowing an occupant to be received softly by the airbag by allowing gas to flow out from the inside of the airbag to the outside thereof and a restricting means for restricting an outflow of gas from the vent hole. The present invention also relates to an airbag device including the airbag.

BACKGROUND ART

It is well known to receive a vehicle occupant or the like softly by an inflated airbag, when the vehicle occupant or the like dives into the airbag, by providing a vent hole to the airbag and allowing gas to flow out from the inside of the airbag via the vent hole.

In Japanese Unexamined Patent Application Publication No. H06-127330, an airbag is described that is constituted in a manner such that a vent hole of the airbag is closed until an occupant comes in contact with an occupant-facing face of the inflated airbag and is opened when the occupant comes in contact with the occupant-facing face of the inflated airbag and the occupant-facing face is moved backward.

In the above publication, a vent hole is provided at a distal-to-occupant side face on the opposite side of an occupant-facing face of an airbag. A slit is provided in the vicinity of the vent hole, and a strap is inserted through the slit. One end side of the strap passes through the inside of the airbag and is connected to the occupant-facing face of the airbag. And, the other end side of the strap is routed from the slit along an outer surface of the airbag so as to cross the vent hole, and joined to the outer surface of the airbag on the side opposite to the slit across the vent hole.

In the above publication, as the airbag is inflated, the strap is tensioned in accordance with separation of the occupant-facing face and the distal-to-occupant side face of the airbag. At this time, the other end side of the strap is tensioned along the outer surface of the airbag to cause the strap to overlap with the vent hole and the vent hole to be closed. The gas is thereby prevented from flowing out from the vent hole, the inside of the airbag is quickly pressurized, and the airbag promptly extends.

When an occupant comes in contact with the inflated airbag and the occupant-facing face of the airbag is moved backward, the strap is slackened, which causes the other end side of the strap to be separated from the vent hole by gas pressure in the airbag; thereby the vent hole is opened, which causes the gas to flow out from the vent hole into the outside of the airbag. As a result, the occupant is received softly by the airbag.

[Patent Document 1] Japanese Unexamined Patent Application Publication No. H06-127330

DISCLOSURE OF THE INVENTION

In the above Japanese Unexamined Patent Application Publication No. H06-127330, even halfway through the inflation of the airbag, if the occupant comes in contact with the airbag and the occupant-facing face of the airbag is moved backward, a tether is slackened, which causes the vent hole is opened. In this case, there is a fear that the gas inside the airbag flows out from the vent hole when the internal pressure of the airbag is not increased enough.

In order to avoid a phenomenon like this, it is thought to make the inflation of an airbag speedy using a high-powered inflator, but employment of the high-powered inflator brings about upsizing of and cost increase for the airbag device.

SUMMARY OF THE INVENTION

An object of the present invention is to provide an airbag and an airbag device, a vent hole of which remains closed or is made open to a small extent until the internal pressure of the airbag becomes equal or more than predetermined, and becomes opened or is made open to a large extent when the internal pressure of the airbag becomes equal or more than predetermined and also when an occupant comes in contact with the airbag.

An airbag of the present invention is characterized in that it has a vent hole and a restricting means for restricting an outflow of gas from the vent hole, the vent hole being provided in a distal-to-occupant side face on the other side of an occupant-facing face, or in a side face of the airbag in a state of being inflated, and the restricting means being provided with a cover member covering the vent hole and a connecting member connecting the cover member and the occupant-facing face, passing though the inside of the airbag, wherein the occupant-facing face and the distal-to-occupant side face are joined together with a joining body on the center side of the airbag relative to the vent hole so as to be disengageable; an intermediate portion of the connecting member in its extension direction is sandwiched between the occupant-facing face and the distal-to-occupant side face, while being joined to both the occupant-facing face and the distal-to-occupant side face with the joining body; the joint of the occupant-facing face, the distal-to-occupant side face and the connecting member with the joining body is disengaged when the internal pressure of the airbag becomes equal or more than predetermined; after this, until an occupant comes in contact with this airbag, the cover member is prevented by the connecting member to move to the outside of the airbag and overlaps on the vent hole, and thereby the vent hole remains closed or is made open to a small extent; and when the occupant comes in contact with this airbag and the occupant-facing face is backed off, the cover member is separated from the vent hole by the gas pressure in the airbag and thereby the vent hole becomes opened or is made open to a large extent.

An airbag device of the present invention is equipped with such an airbag of the present invention and an inflator for supplying gas to the airbag.

DETAILED DESCRIPTION

Figure 1:
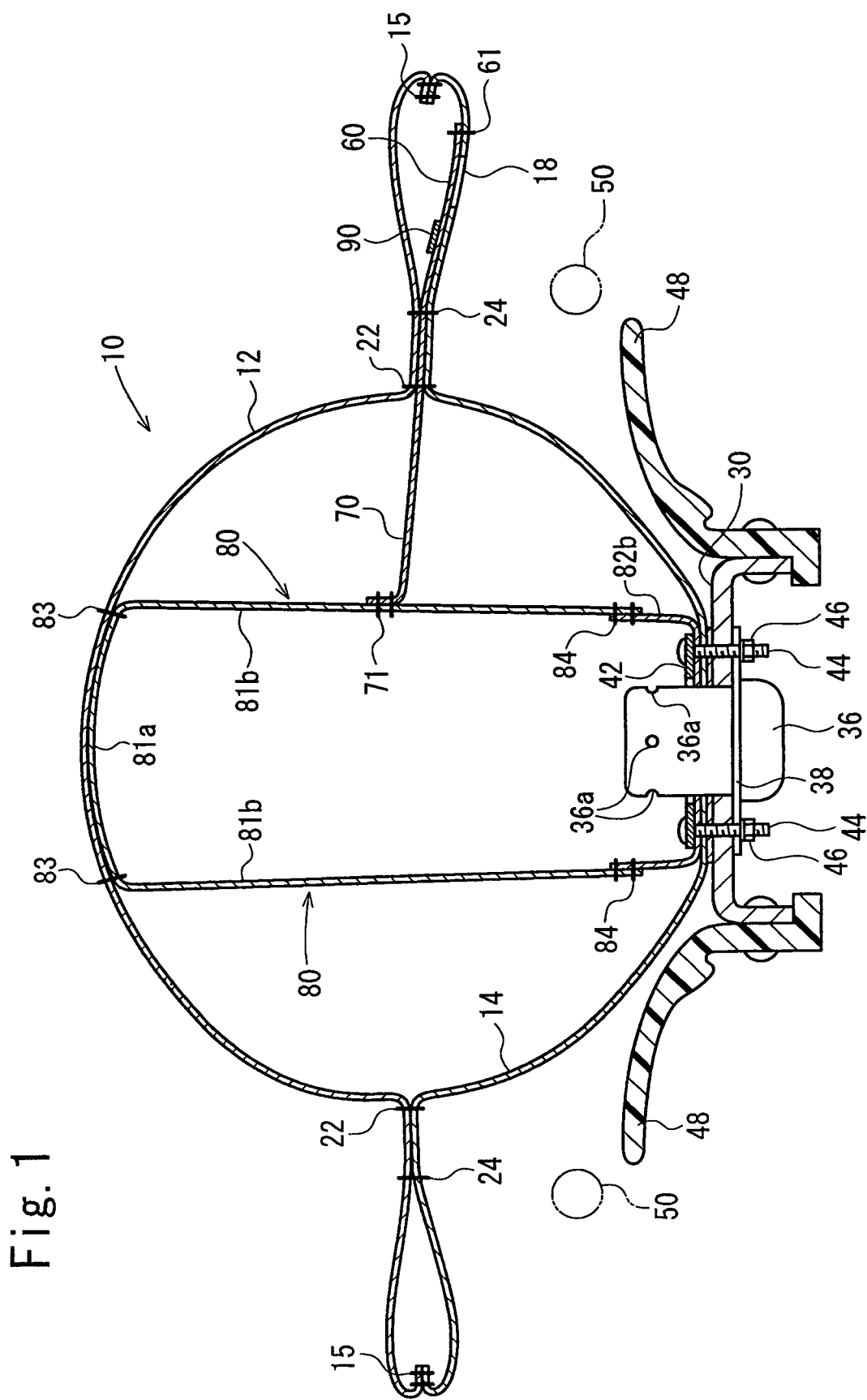
FIG. 1 is a cross-section view showing a state of an airbag and an airbag device according to an embodiment, in which inflation of the airbag is restricted by joining means.

An airbag of a first aspect is characterized in that it has a vent hole and a restraining means for restraining an outflow of gas from the vent hole, the vent hole being provided in a distal-to-occupant side face on the other side of an occupant-facing face, or in a side face of the airbag in a state of being inflated, and the restricting means being provided with a cover member covering the vent hole and a connecting member connecting the cover member and the occupant-facing face, passing though the inside of the airbag, wherein the occupant-facing face and the distal-to-occupant side face are joined together with a joining body on the center side of the airbag relative to the vent hole so as to be disengageable; an intermediate portion of the connecting member in its extension direction is sandwiched between the occupant-facing face and the distal-to-occupant side face, while being joined to both the occupant-facing face and the distal-to-occupant side face with the joining body; the joint of the occupant-facing face, the distal-to-occupant side face and the connecting member with the joining body is disengaged when the internal pressure of the airbag becomes equal or more than predetermined; after this, until an occupant comes in contact with this airbag, the cover member is prevented by the connecting member to move to the outside of the airbag and overlaps on the vent hole, and thereby the vent hole remains closed or is made open to a small extent; and when the occupant comes in contact with this airbag and the occupant-facing face is backed off, the cover member is separated from the vent hole by the gas pressure in the airbag and thereby the vent hole becomes opened or is made open to a large extent.

An airbag of a second aspect is characterized in that, in the first aspect, the cover member covers the vent hole from the inside of the airbag; an inserting-through portion for the connecting member is provided on the inner surface of the airbag in the distal-to-occupant side face or the side face; one end side of the connecting member is connected to the occupant-facing face, an intermediate portion of the connecting member is inserted through the inserting-through portion, and the other end side of the connecting member is connected to one end of the cover member; and an end portion of the cover member on the side opposite to the connecting member across the vent hole.

An airbag of a third aspect is characterized in that, in the first aspect, the cover member covers the vent hole from the outside of the airbag, and the connecting member passes through the vent hole and across the inside of the airbag to connect the cover member to the occupant-facing face.

An airbag of a fourth aspect is characterized in that, in any one of the first to third aspects, an internal member connecting the occupant-facing face and the distal-to-occupant side face of the airbag in a state of being inflated is provided in the airbag, and the connecting member is connected to the internal member.

An airbag of a fifth aspect is characterized in that, in any one of the first to fourth aspects, an opening for use with an inflator is provided in the vicinity of the center of the distal-to-occupant side face of the airbag, and the occupant-facing face and the distal-to-occupant side face are joined together with the joining body provided between the opening and the vent hole to extend in substantially an annular shape or a spiral shape so as to go around the opening.

An airbag device of a sixth aspect is characterized in that it includes an airbag of any one of the first to fifth aspects, an inflator for supplying gas to the airbag, a retainer to which the airbag is mounted, and a fixing member for fixing the airbag to the retainer.

In an airbag and an airbag device of the present invention, when an inflator blows out gas in an event of a vehicle collision or the like, and the airbag is inflated with the gas from the inflator, an occupant-facing face and a distal-to-occupant side face of the airbag are joined by a joining means on the center side of the airbag with respect to a vent hole until the internal pressure of the airbag becomes equal or more than predetermined. Moreover, an intermediate portion of a connecting member is joined together with the occupant-facing face and the distal-to-occupant side face by the joining means.

That is, in an early stage of airbag inflation, the inflation of the airbag is partially restricted due to the joining means, and thereby the airbag is in a state having a reduced volume. Therefore, the internal pressure of the airbag is quickly increased without using a high-powered inflator.

When the internal pressure of the airbag becomes equal or more than predetermined, the joining means is broken, so the joint of the occupant-facing face and the distal-to-occupant side face of the airbag and also the joint of these and the connecting member are disengaged. Because of this, the airbag is inflated to the maximum.

After this, until an occupant comes in contact with this airbag, connecting member is tensioned between the occupant-facing face of the airbag and a cover member, and thereby the cover member is prevented by the connecting member to move to the outside of the airbag and overlaps on the vent hole, so the vent hole remains closed or is made open to a small extent. As the result, an outflow of gas from the vent hole is restricted, and the internal pressure in the airbag is maintained to be equal or more than predetermined.

And, when the occupant comes in contact with this airbag, the occupant-facing face of the airbag is pushed to move backward, and according to this, the connecting member is slackened. Since the cover member becomes movable by the amount of the slack to the outside of the airbag, the cover member is separated from the vent hole by the gas pressure in the airbag. With this, the vent hole becomes opened or is made open to a large extent, and gas flows out from the vent hole to the outside of the airbag, which causes the occupant to be softly received by this airbag.

By the way, in the case when an occupant comes in contact with this airbag before the internal pressure of the airbag becomes equal or more than predetermined, i.e., before the joining means is broken, since an intermediate portion of the connecting member in its extension direction is joined with the occupant-facing face and the distal-to-occupant side face by the joining means, the portion of the connecting member on the side of the cover portion with respect to the intermediate portion in its extension direction is not slackened. Therefore, the cover member is not allowed to move to open, and the vent hole remains to be covered with the cover member. For this reason, the gas does not flow out from the vent hole and the internal pressure in the airbag does not decrease, so the occupant is restrained by this airbag.

After this, when the internal pressure in the airbag becomes equal or more than predetermined, the joining means is broken. At this time, since the occupant-facing face is already in a state of being moved backward by being pushed by the occupant and the connecting member is not stretched, the cover member is immediately separated from the vent hole by the gas pressure in the airbag, and thereby the vent hole becomes opened or is made open to a large extent. Because of this, the gas flows out from the vent hole to the outside of the airbag, and the occupant is received softly by the airbag.

In the present invention, the vent hole may be configured so as to be covered with the cover member from the inside of the airbag. In this case, if configured as with the second aspect, when the airbag is inflated, the cover member covering the vent hole from the inside of the airbag and a portion of the connecting member connected to the covering member, i.e., a portion from an inserting-through portion to the covering member extends continuously along an inner surface of the airbag, so the contactability of the covering member to the inner surface of the airbag, i.e., the closing ability of the vent hole becomes favorable.

Alternatively, in the present invention, the vent hole may be configured so as to be covered with the cover member from the outside of the airbag. In this case, as with the third aspect, the covering member and the occupant-facing face of the airbag are connected a connecting member passed through the vent hole, which does not need to provide an inserting-through portion for the connecting member additionally and allows an airbag configuration to be simplified. In addition, if configured like this, when the airbag is inflated, since the connecting member pulls the covering member to the inside of the airbag through the vent hole, the contactability of the covering member to a peripheral rim portion of the vent hole, i.e., the closing ability of the vent hole becomes favorable.

In the present invention, the connecting member may be such as to directly connect the covering member and the occupant-facing face. Or, as with the fourth aspect, in the case that an internal member for connecting the occupant-facing face and the distal-to-occupant side face of the airbag is provided inside of the airbag, the covering member and the occupant-facing face may be indirectly connected via the internal member by connecting the connecting member to the internal member.

As with the fifth aspect, in the case when the occupant-facing face and the distal-to-occupant side face are joined together with a joining means provided to extend in substantially an annular shape or a spiral shape so as to go around the opening for gas introduction, the airbag is inflated substantially equally in radiation directions.

It is noted that, in the present invention, "substantially an annular shape or a spiral shape" means that the joining means may be provided to extend in a perfect circular shape, or in a shape except a perfect circular shape. For example, the joining means may be provided to extend in a variety of shapes such as a polygonal shape, a shape having a portion in a circumferential direction which enters partially into the center side of the airbag, a shape having a portion which projects partially into the periphery side of the airbag, or the like. The joining means may also be such as to join the occupant-facing face and the distal-to-occupant side face partially in a circumferential direction of the airbag.

Embodiments of the present invention will be described below with reference to the attached drawings.

Figure 2:
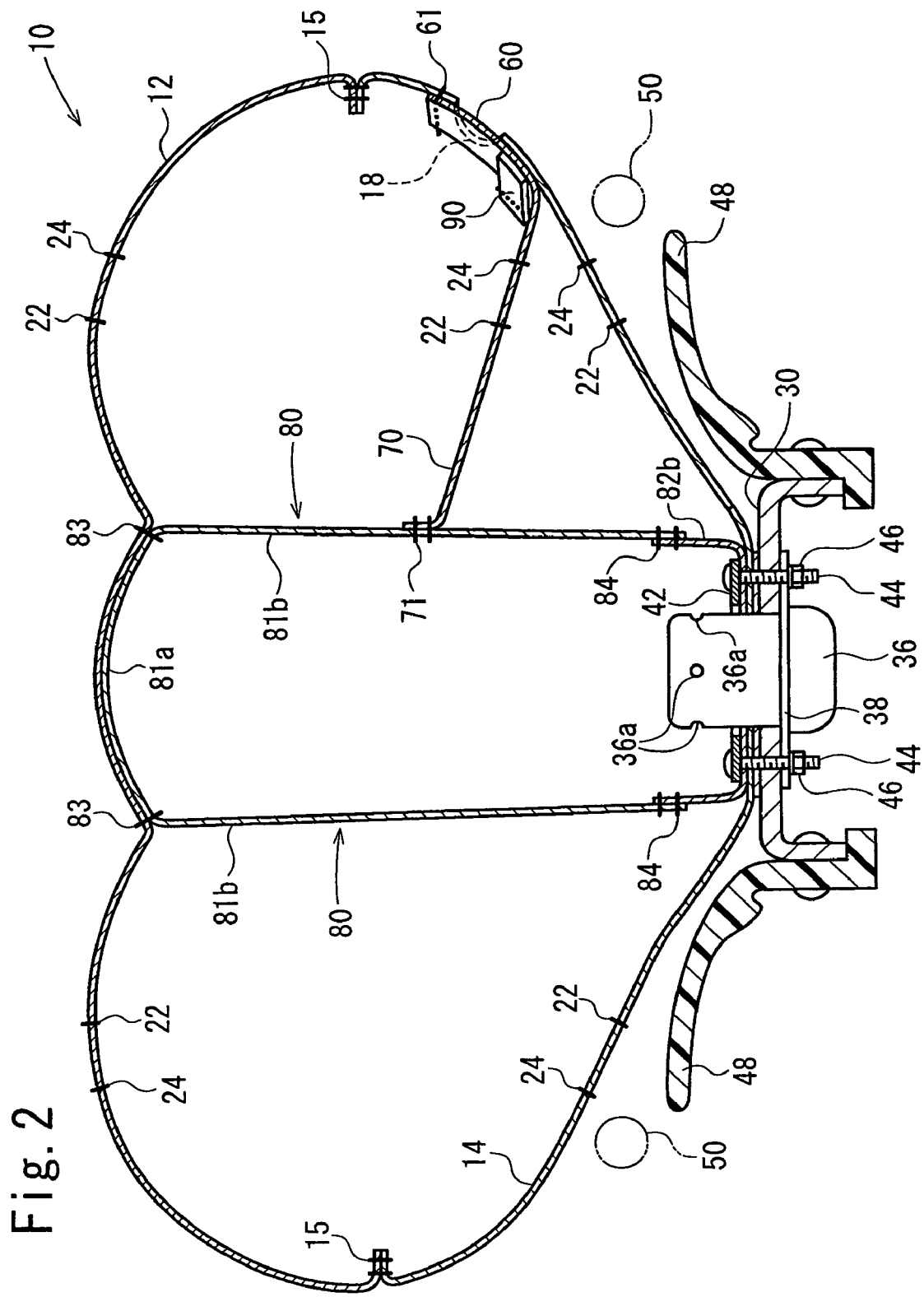
FIG. 2 is a cross-section view showing a state of the airbag and the airbag device in FIG. 1, in which the joining means are broken and an occupant does not get in contact with the airbag yet.
Figure 3:
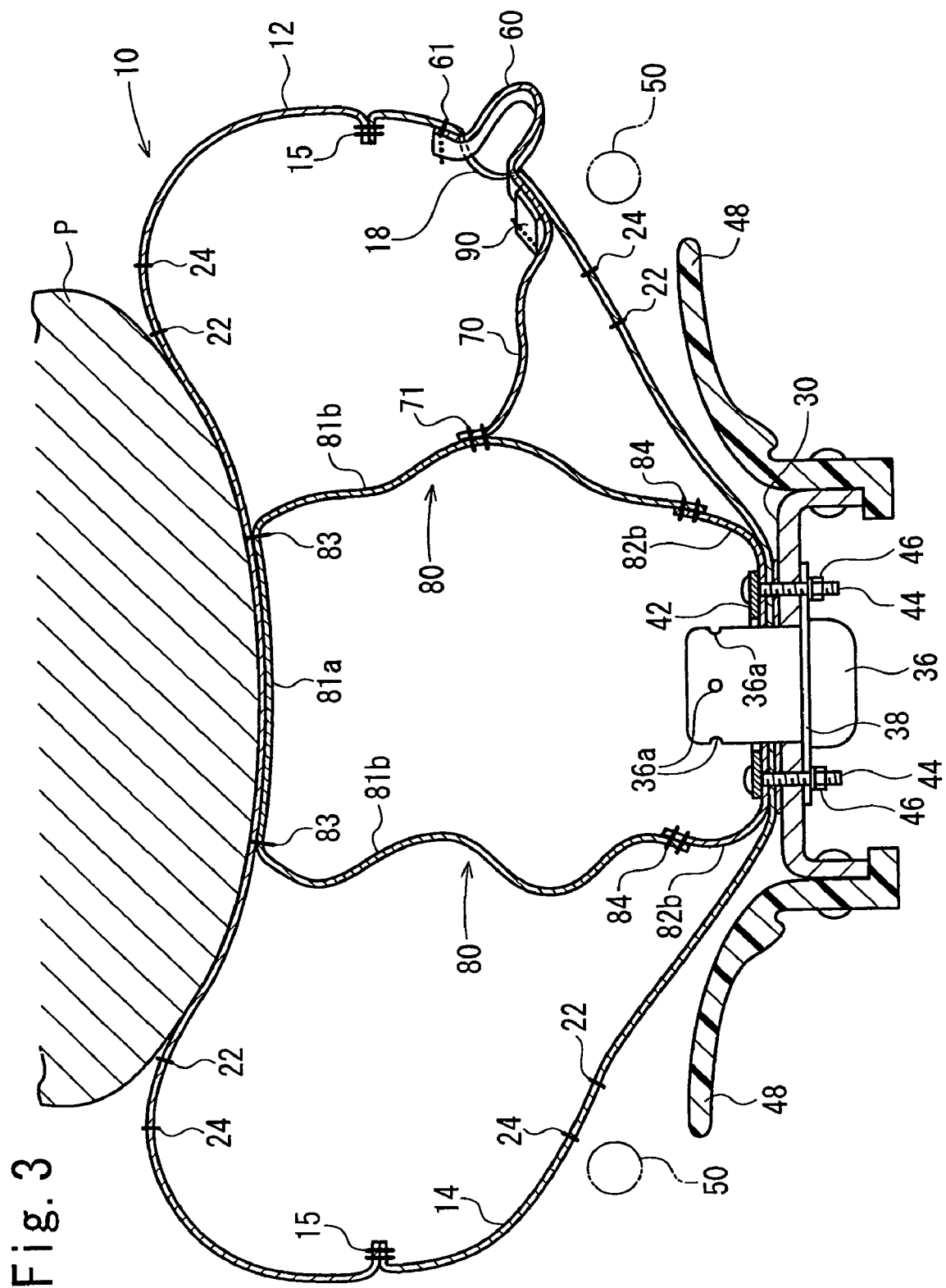
FIG. 3 is a cross-section view showing a state of the airbag and the airbag device in FIG. 1, in which the occupant comes in contact with the airbag after the joining means have been broken.
Figure 4:
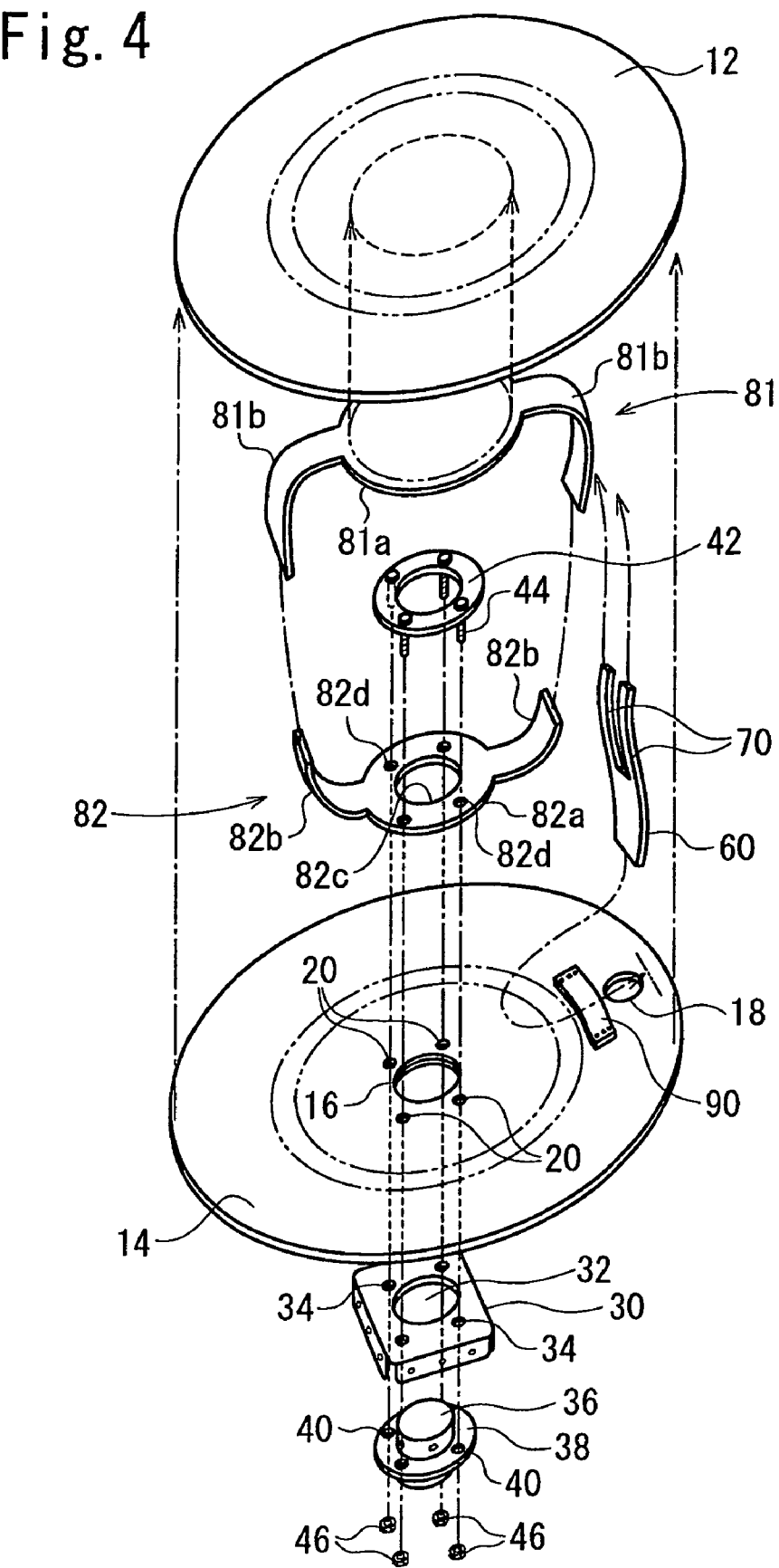
FIG. 4 is an exploded perspective view of the airbag and the airbag device in FIG. 1.
Figure 5:
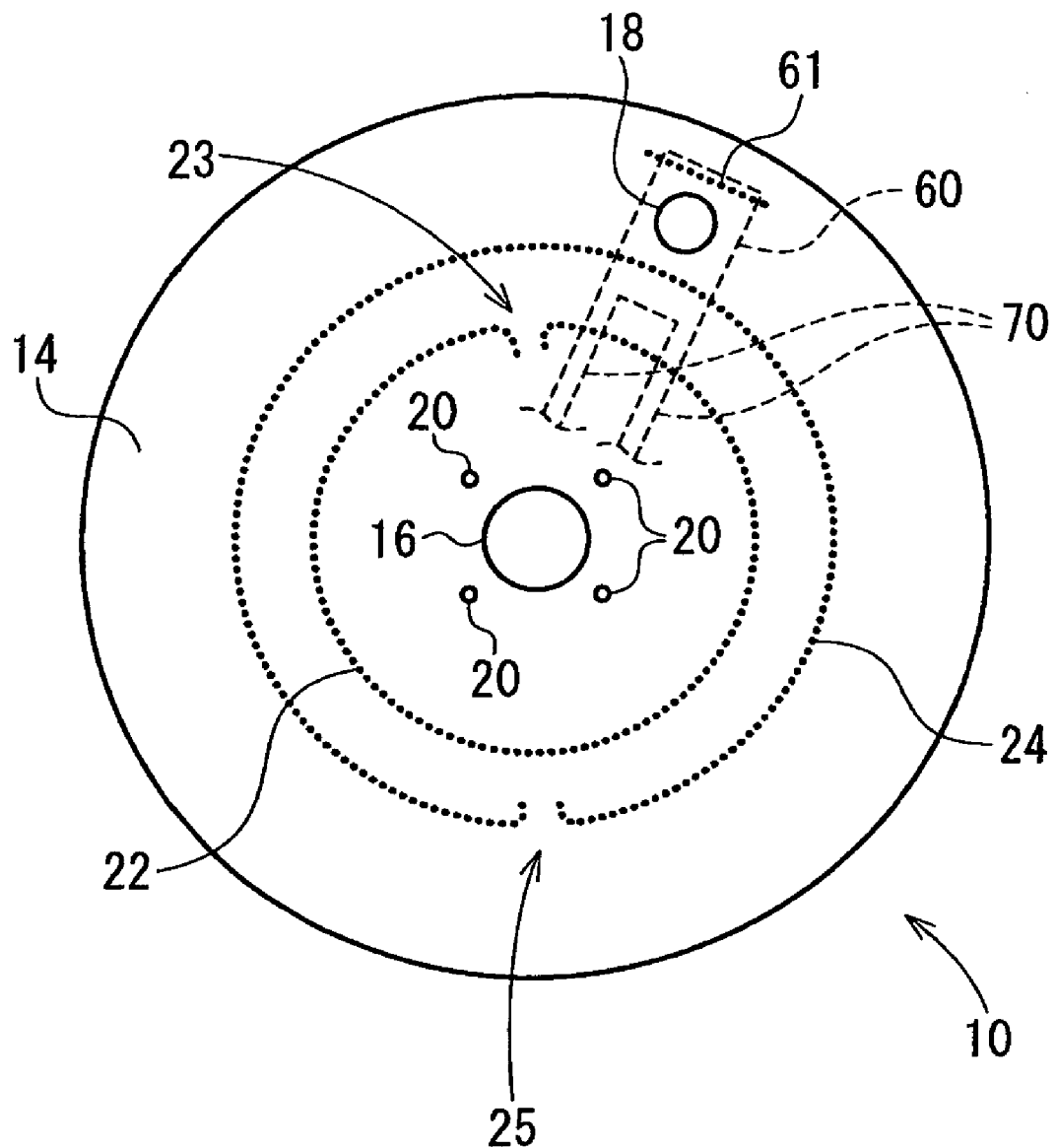
FIG. 5 is a plan view of the airbag in FIG. 1 seen from a rear panel side.

FIG. 1 to FIG. 3 are cross-section views of an airbag and an airbag device according to an embodiment, FIG. 4 is an exploded perspective view of the airbag and the airbag device, and FIG. 5 is a plan view of this airbag seen from a rear panel side. Incidentally, FIG. 1 shows a state in which inflation of the airbag is restricted by joining means, FIG. 2 shows a state in which the joining means are broken and an occupant does not get in contact with the airbag yet, and FIG. 3 shows a state in which the occupant comes in contact with the airbag after the joining means have been broken.

In this embodiment, the airbag 10 is an airbag for a Driver's seat of a vehicle.

This airbag 10 includes a front panel 12 constituting an occupant-facing face, a rear panel 14 constituting a distal-to-occupant side face on the opposite side of the occupant-facing face, a hanging rope 80 as an internal member for connecting the front panel 12 and the rear panel 14 inside the airbag 10, a vent hole 18 connecting the inside and the outside of the airbag 10, a cover member 60 for restricting outflow of gas from the vent hole 18, a tether 70 as a connecting member for connecting the cover member 60 to the hanging rope 80, and the like.

The front panel 12 and the rear panel 14 are each composed of a circular fabric. The front panel 12 and the rear panel 14 are each of a substantially identical diameter, and are formed in a bag body-like member by that the outer rims thereof are sewn together with a seam 15. The seam 15 is provided in an annular shape along the outer periphery of the front panel 12 and the rear panel 14. The seam 15 is of a high strength seam that is not broken even when the internal pressure of the airbag 10 becomes equal or more than predetermined. It is noted that the seam 15 is composed of a sewing thread or the like, but it is not limited to these.

The rear panel 14 is provided with an opening 16 for use with an inflator, i.e., for introducing gas, and the vent hole 18 described above. The opening 16 is disposed in the center of the rear panel 14. There are provided bolt insertion holes 20 around the opening 16. In this embodiment, the vent hole 18 is disposed in a position relatively proximate to the outer rim of the rear panel 14, i.e., the seam 15.

In this embodiment, the cover member 60 is overlapped to the vent hole 18 from the inside of the airbag 10. In this embodiment, the cover member 60 is disposed in a radial direction of the rear panel 14 so as to cross the vent hole 18, and the end portion thereof on the outer periphery side of the rear panel 14 is fixed by being sewn to the rear panel 14 with a seam 61 at a position on the outer periphery side of the rear panel 14 relative to the vent hole 18. One end of the tether 70 is connected to the end portion of the cover member 60 on the center side of the rear panel 14.

It is noted that, in this embodiment, two tethers 70, are connected to the end portion of the cover member 60 on the center side of the rear panel 14 at different positions in a circumferential direction. Additionally, in this embodiment, these tethers 70, 70 are composed with the cover member 60 integrally in a string. However, the number of the tethers may be one or three or more. The tether 70 and the cover member 60 may also be composed as separate ones.

In this embodiment, on an airbag interior-side surface of the rear panel 14, there is provided an inserting-through portion 90 through which an intermediate portion of the tethers 70 are inserted. As shown in FIG. 4, the inserting-through portion 90 is disposed in a position relatively proximate to the vent hole 18 on the center side with respect to the vent hole 18.

In this embodiment, the inserting-through portion 90 is composed of a small piece of cloth having a substantially rectangular shape. The small piece of cloth having a substantially rectangular shape is disposed so that its longitudinal direction meets a circumferential direction of the rear panel 14, i.e., a direction intersecting the extension direction of the cover member 60, and a pair of two side portions opposing to each other in the longitudinal direction are each fixed to the rear panel 14 by being sewn with a seam (the reference numeral is omitted). The tethers are passed through between the remaining pair of two sides in the transversal direction of the piece of cloth and the rear panel 14. Incidentally, in this embodiment, the two tethers 70, 70 are inserted through the inserting-through portion 90 common thereto.

The hanging rope 80 described above is, in this embodiment, composed of a first hanging rope component 81 on the side of the front panel 12 and a second hanging rope component 82 on the side of the rear panel 14.

The first hanging rope component 81 includes a base piece portion 81*a* located in the center portion of the front panel 12, and two rope-like bodies 81*b*, 81*b* extending in radiation directions from the perimeter of the base piece portion 81*a*. The base piece portion 81*a* is composed of a circular fabric having a diameter smaller than that of the front panel 12, and the rope-like bodies 81*b*, 81*b* are located in a positional relationship of being opposed to each other, having the center of the base piece portion 81*a* in therebetween. The base piece portion 81*a* is located substantially concentrically with the front panel 12, and is fixed to the center portion of the front panel 12 by being sewn with a seam 83.

Likewise, second hanging rope component 82 includes, in this embodiment, a base piece portion 82*a* located in the center portion of the rear panel 14, and two rope-like bodies 82*b*, 82*b* extending in radiation directions from the perimeter of the base piece portion 82*a*. The base piece portion 82*a* is composed of a circular fabric having a diameter smaller than that of the rear panel 14, and the rope-like bodies 82*b*, 82*b* are located in a positional relationship of being opposed to each other, having the center of the base piece portion 82*a* in therebetween. In the center of the base piece portion 82*a*, there is provided an opening 82*c* for use with an inflator, the opening 82*c* overlapping with the inflator opening 16 of the rear panel 14. Moreover, around the opening 82*c*, there are provided bolt insertion holes 82*d* overlapping with the bolt insertion holes 20 described above.

Top end portions of each of the rope-like bodies 81*b*, 82*b* of the respective hanging rope components 81, 82 are sewn together with seams 84.

In this embodiment, the other end of each of the tethers 70 is fixed to an intermediate portion of one of string bodies of the rope-like bodies 81*b*, 82*b* by being sewn. This string body is occasionally denoted as the hanging rope 80. Reference numeral 71 denotes the seam with which the other end of each of the tethers 70 is fixed to the hanging rope 80 by being sewn.

It is noted that the length of each of the tethers 70 is made so that, when the airbag 10 is inflated and then each of the tethers 70 is tensioned by being pulled toward the inside of the airbag 10 as the hanging rope 80 is stretched toward the side of an occupant P, the cover member 60 is prevented from moving to the outside of the airbag 10, i.e., from being pushed out to the outside of the airbag 10 from the vent hole 18 by the gas pressure in the airbag 10, and at the same time the cover member 60 is not raised from the inner surface of the rear panel 14 by being pulled excessively with the tethers 70 toward the inside of the airbag 10.

As shown in FIG. 1, an area of the rear panel 14 on its outer periphery side of the inflator opening 16 and the bolt insertion holes 20 and also on its inner periphery side of the inserting-through portion 90, and an area of the front panel 12 facing this area are joined together with line-like joining portions 22, 24 so as to be disengageable, the line-like joining portions 22, 24 each being an annular joining means extending in a circumferential direction of the airbag so as to go around the inflator opening 16. Furthermore, as shown in FIG. 1, an intermediate portion of each of the tethers 70 in its extension direction is sandwiched between the front panel 12 and the rear panel 14, and the front panel 12, the rear panel 14 and an intermediate portion of each of the tethers 70 are joined together with each of the line-like joining portions 22, 24.

Incidentally, in the state that the front panel 12, the rear panel 14 and an intermediate portion of each of the tethers 70 are thus joined together with each of the line-like joining portions 22, 24, the length of each of the tethers 70 from the line-like joining portion 24 on the outer periphery side to the distal end of the cover member 60 is made so that the cover member 60 is prevented from moving to the outside of the airbag 10 through the vent hole 18, and at the same time the cover member 60 is not raised from the inner surface of the rear panel 14 by being pulled excessively with the tethers 70 toward the inside of the airbag 10.

That is, under the condition that the front panel 12, the rear panel 14 and an intermediate portion of each of the tethers 70 are thus joined together with each of the line-like joining portions 22, 24, the cover member 60 is confined in a state of covering the vent hole 18.

The line-like joining portions 22, 24 are constructed so as to be broken to disengage the joint of the front panel 12 and the rear panel 14, and the joint of these and the tethers 70, when the internal pressure of the airbag 10 becomes equal or more than predetermined. Each of the line-like joining portions 22, 24 can be composed of, for example, a sewing thread which is cut when a predetermined tension is applied thereto, i.e., a tear seam, or the like, but it is not limited to these ones.

These line-like joining portions 22, 24 are, as shown in FIG. 5, provided to extend substantially concentrically. Hereafter, the locations of the line-like joining portions 22, 24 are occasionally designated as a first round and a second round from the inner periphery side.

It is noted that, in the present invention, the first round, i.e., the line-like joining portion 22 on the most inner periphery side is preferably disposed at a radius from the center of the airbag between 450 and 550 mm, and the spacing between the line-like joining portions 22, 24 adjoining with each other in a radial direction is preferably between 20 and 50 mm.

Although two rounds of the line-like joining portions 22, 24 in total are provided in this embodiment, only one round or three rounds or more may be provided.

The line-like joining portions 22, 24 are provided with connection portions 23, 25, respectively, by partially discontinuing the joint of the front panel 12 and the rear panel 14, the connection portions 23, 25 each connecting its inner periphery side and its outer periphery side.

As shown in FIG. 5, regarding between the line-like joining portions 22, 24 adjoining with each other in a radial direction, the connection portions 23, 25 are positioned in opposite sides to each other across the center of the airbag 10. Incidentally, in this embodiment, the connection portion of the first round line-like joining portion 22 is disposed on the side directly above the center of the airbag 10, and the connection portion of the second round line-like joining portion 24 is disposed on the side directly below the center of the airbag 10.

The vent hole 18 described above is positioned on the outer periphery side of the airbag relative to the line-like joining portion 24 on the outer periphery side and also on the side opposite to the connection portion 25 of the line-like joining portion 24 across the center of the airbag 10. In this embodiment, the vent hole 18 is disposed at a position deviating slightly to the right side in FIG. 5 from the side directly above the center of the airbag 10.

However, the arrangement of the connection portions 23, 25 and the vent hole 18 is not limited to this, but they may be disposed, for example, alternately on the left and right sides or the diagonally upper and diagonally lower sides across the center of the airbag 10 by turns.

As shown in the drawing, in this embodiment, the both end sides of each of the line-like joining portions 22, 24 facing the connection portions 23, 25 each extend toward the center side of the airbag 10. Hereafter, the both end sides, each of which extends toward the center of the airbag 10 like this, of the line-like joining portions 22, 24 are each occasionally designated as a radial direction extension portion (the reference numeral is omitted) and the other portion extending in a circumferential direction of the airbag 10 is occasionally designated as a circumferential direction extension portion (the reference numeral is omitted).

The radial direction extension portions of each of the line-like joining portions are connected to the both ends of the circumferential direction extension portion as being gradually curved, respectively.

It is noted that, in the present invention, the shape of the line-like joining portion as a joining means provided to extend in the periphery of the inflator opening 16 may be one of a variety of shapes except a perfect circular shape, for example, polygonal shapes such as a hexagonal shape, a octagonal shape and the like (the number of angles is not particularly limited), or a shape having a portion in a circumferential direction which enters partially into the center side of the airbag or a portion which projects partially into the periphery side of the airbag. Or, the line-like joining portion as a joining means may be provided to extend in a spiral-like shape as with another embodiment in FIG. 6 to FIG. 10 described later. Furthermore, a plurality of connection portions may be formed at different positions of the line-like joining portion in a circumferential direction of the airbag.

A retainer 30 for mounting the airbag 10 is provided with an inflator installation port 32 and bolt insertion holes 34 therearound.

An inflator 36 is of a substantially cylindrical shape and is provided with a plurality of gas blow-out ports 36a on a side peripheral surface on the tip side in its tube axis direction. A flange 38 for fixing the inflator is provided to project from an intermediate portion of the inflator 36 in its tube axis direction, i.e., from a side peripheral surface on the rear end side relative to the gas blow-out ports 36a. The flange 38 is provided with bolt insertion holes 40. The inflator 36 is installed by that the tip side thereof is inserted into the inflator installation port 32.

When the airbag 10 is mounted to the retainer 30, the peripheral rim portion of the inflator opening 82c of the base piece portion 82a is overlapped with the peripheral rim portion of the inflator installation port 32 of the retainer 30, and then overlapped to the peripheral rim portion of the inflator installation port 32 of the retainer 30. Then, stud bolts 44 of a retaining ring 42 are inserted through the respective bolt holes 82d, 20, 34, 40 of the base piece portion 82a, the rear panel 14, the retainer 30 and the flange 38, and fixed to the base piece portion 82a, the rear panel 14 and the inflator 36 to the retainer 30 by being screwed into nuts 46.

The rope-like bodies 82b are thus connected to the rear panel 14 via the base piece portion 82a, the rope-like bodies 82b, 81b are connected to each other by the seam 84, and the rope-like bodies 81b are connected to the front panel 12 via the base piece portion 81a.

After this, the airbag 10 is folded and a module cover 48 is mounted to the retainer 30 so as to cover the folded body of the airbag 10; thereby an airbag device is constructed. However, the airbag 10 may be folded in preceding to the mounting to the retainer 30. This airbag device is installed in a steering wheel 50 of an automobile.

When an automobile equipped with an airbag device thus constructed comes into collision, the inflator 36 is activated to blow out gas into the airbag 10. The airbag 10 is inflated with the gas to push open the module cover 48 and extends to the inside of a vehicle cabin to restrain the occupant P on the driver's seat.

In this occasion, since the joint of the front panel 12 and the rear panel 14 with each of the line-like joining portions 22, 24 is not disengaged until the internal pressure of the airbag 10 becomes equal or more than predetermined as shown in FIG. 1, the inflation in a portion of the airbag 10 on its outer periphery side with respect to the line-like joining portions 22, 24 is restricted. Therefore, the internal pressure of the airbag 10 is quickly increased without using any high-powered one as the inflator 36.

The stresses due to the internal pressure of the airbag 10 concentrate on both the radial direction extension portions of the line-like joining portion 22 facing the connection portion 23. Then, when the internal pressure of the airbag 10 becomes equal or more than predetermined, breakage of the line-like joining portion 22 starts from these radial direction extension portions. The breakage of the line-like joining portion 22 is transmitted from each of the radial direction extension portions to the left and right end sides of the circumferential direction extension portion, and advances from the left and right end sides toward to the vicinity of the middle point of the circumferential direction extension portion.

When the whole of the line-like joining portion 22 is broken, the stresses due to the internal pressure of the airbag 10 concentrate on both the radial direction extension portions of the line-like joining portion 24 facing the connection portion 25, breakage of the line-like joining portion 24 starts from these radial direction extension portions. The breakage of the line-like joining portion 24 is also transmitted from each of the radial direction extension portions to the left end side and the right end side of the circumferential direction extension portion, and advances from left and right sides toward to the vicinity of the middle point of the circumferential direction extension portion.

Due to the breakage of the line-like joining portion 24 on an outer periphery side, the area of the front panel 12 and the rear panel 14 from the line-like joining portion 24 to the most peripheral portion of the airbag 10 becomes separatable and, as seen in FIG. 2, the airbag 10 is inflated up to its most peripheral portion. Also due to the breakage of the line-like joining portion 24, the joints of both the front panel 12 and the rear panel 14 and each of the tethers 70 are disengaged, and each of the tethers 70 is therefore stretched between the hanging rope 80 and the cover member 60.

After this, until the occupant P comes in contact with this airbag 10, the cover member 60 is prevented by each of the tethers 70 to move to the outside of the airbag 10, and overlaps on the vent hole 18; thereby the vent hole 18 remains in the state of being closed. For this reason, flow out of gas from the vent hole 18 is restricted and the internal pressure of the airbag 10 is maintained to be equal or more than predetermined.

And, in the case when the occupant P comes in contact with this airbag 10, as shown in FIG. 3, the front panel 12 is pushed by the occupant P to move backward to the side of the rear panel 14; thereby the hanging rope 80 is slackened and the cover member 60 becomes movable by the amount to the outside of the airbag 10. Because of this, the cover member 60 is pushed out from the vent hole 18 to the outside of the airbag 10 by the gas pressure in the airbag, and the vent hole 18 becomes opened. As the result, the gas flows out from the vent hole 18 to the outside of the airbag 10, and the occupant P is received softly by the airbag 10.

By the way, although not shown in the drawings, when the occupant P comes in contact with this airbag 10 before the internal pressure of the airbag 10 becomes equal or more than predetermined, i.e., before each of the line-like joining portions 22, 24 is broken, since an intermediate portion of each of the tethers 70 in its extension direction is joined with the front panel 12 and the rear panel 14 by the respective line-like joining portions 22, 24, the portion of each of the tethers 70 on the side of the cover portion 60 with respect to the line-like joining portions 22, 24 is not slackened, even when the front panel 12 moves backward by being pushed by the occupant P. Accordingly, the vent hole 18 remains to be covered with the cover member 60. For this reason, the gas does not flow out from the vent hole 18 to the outside of the airbag 10 and the internal pressure in the airbag 10 does not decrease, so the occupant P is restrained by this airbag 10.

After this, when the internal pressure in the airbag 10 becomes equal or more than predetermined, each of the line-like joining portions 22, 24 is broken. At this time, since the front panel 12 is already in a state of being moved backward by being pushed by the occupant P, the hanging rope 80 and each of the tethers 70 are not stretched, the cover member 60 is immediately pushed out from the vent hole 18 to the outside of the airbag 10 by the gas pressure in the airbag 10, and the vent hole 18 becomes opened. Because of this, the gas flows out from the vent hole 18 to the outside of the airbag 10, and the occupant P is received softly by the airbag 10.

In the above embodiment, the vent hole 18 is configured so as to be covered with the cover member 60 from the inside of the airbag, but the vent hole 18 may be configured so as to be covered from the outside of the airbag.

Figure 6:
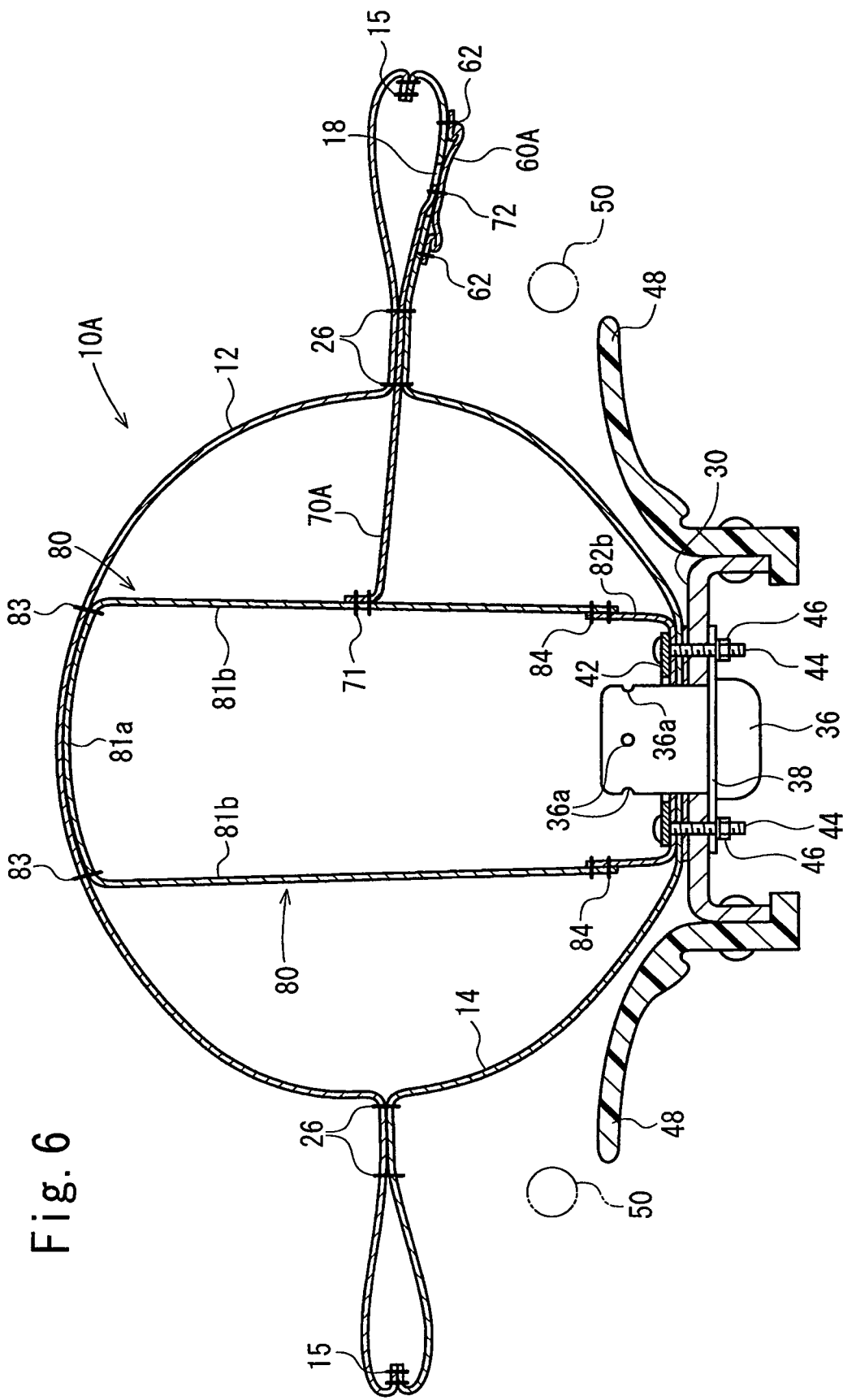
FIG. 6 is a cross-section view showing a state of an airbag and an airbag device to another embodiment, in which inflation of the airbag is restricted by joining means.
Figure 7:
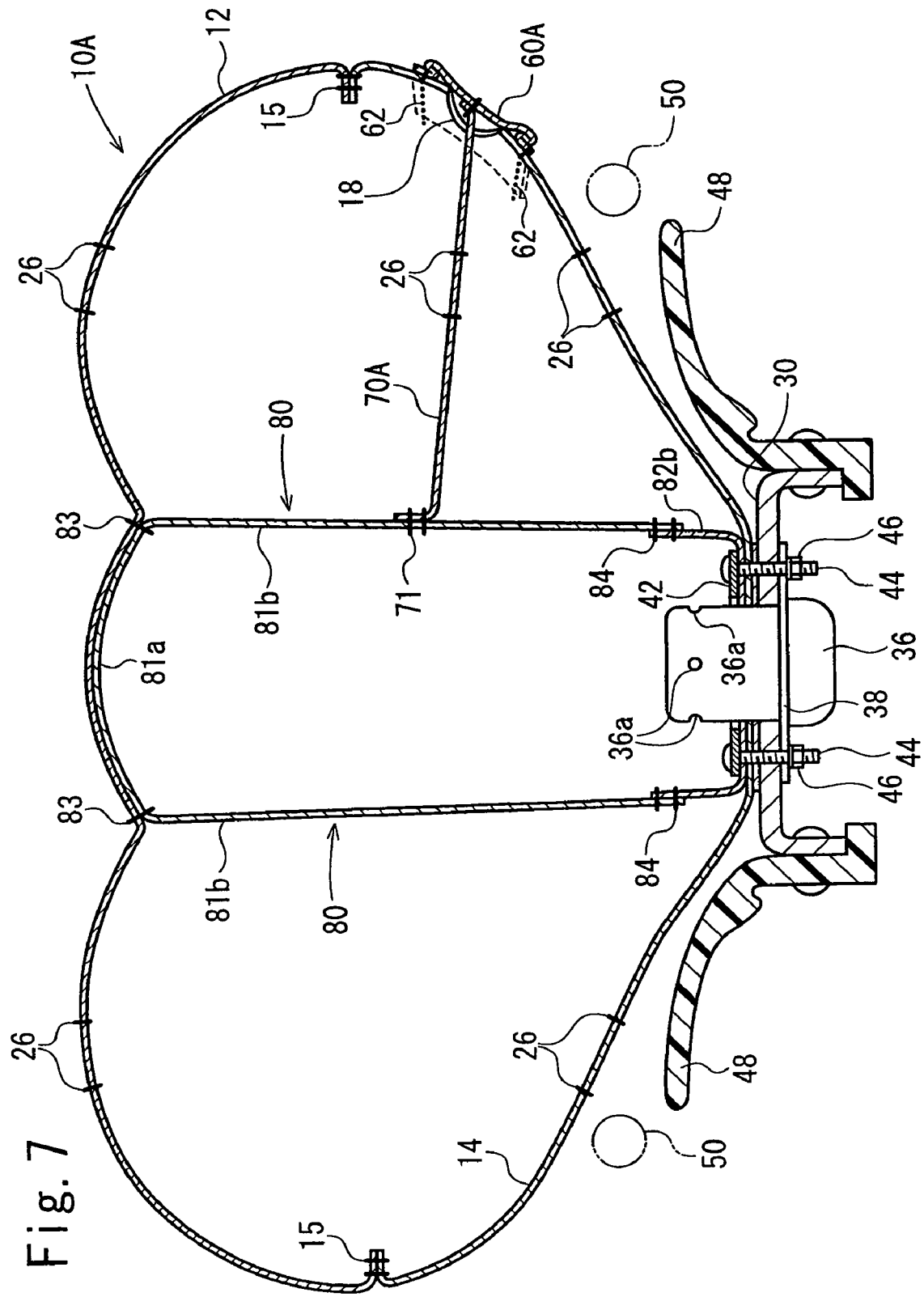
FIG. 7 is a cross-section view showing a state of the airbag and the airbag device in FIG. 6, in which the joining means are broken and an occupant does not get in contact with the airbag yet.
Figure 8:
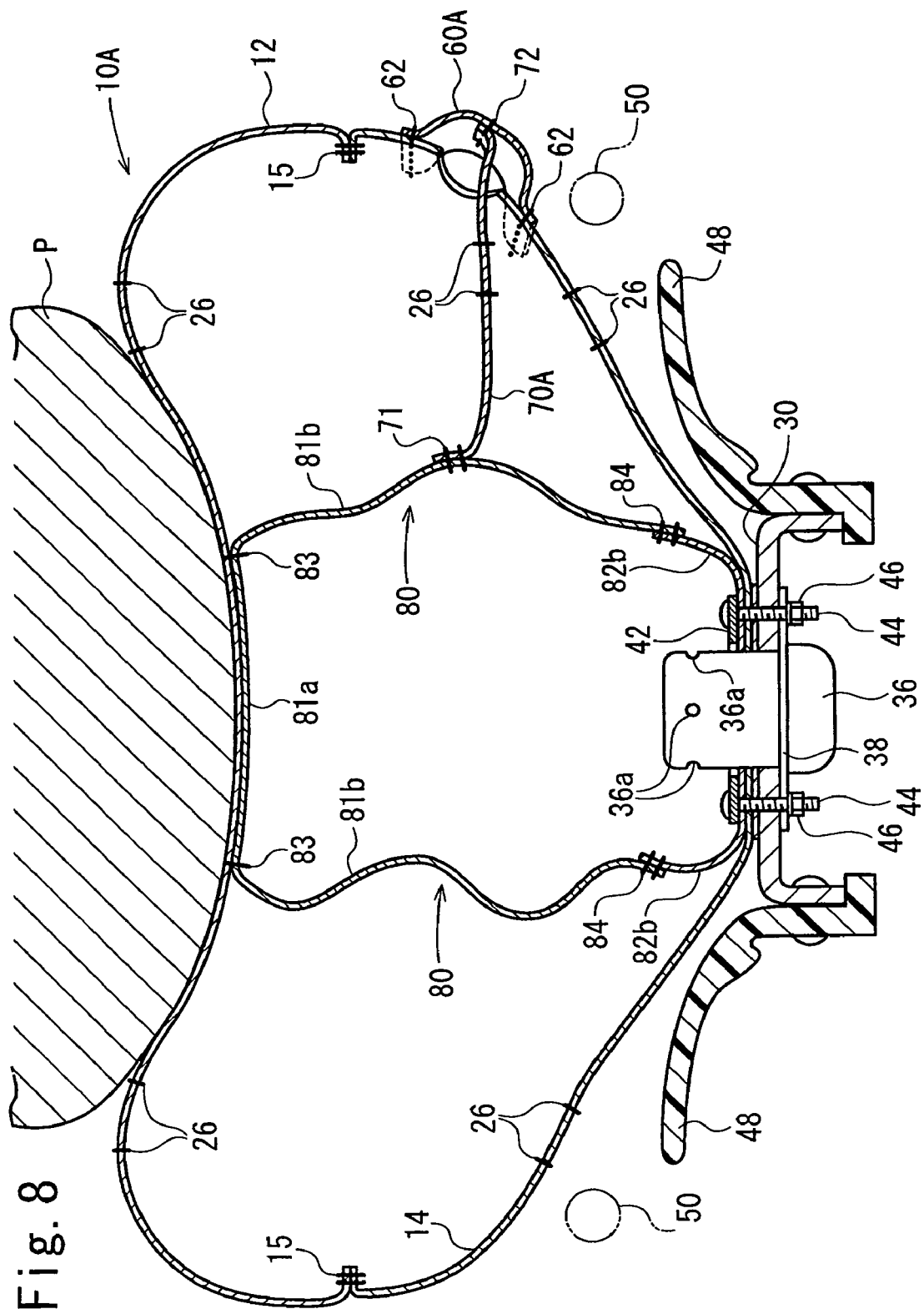
FIG. 8 is a cross-section view showing a state of the airbag and the airbag device in FIG. 6, in which the occupant comes in contact with the airbag after the joining means have been broken.
Figure 9:
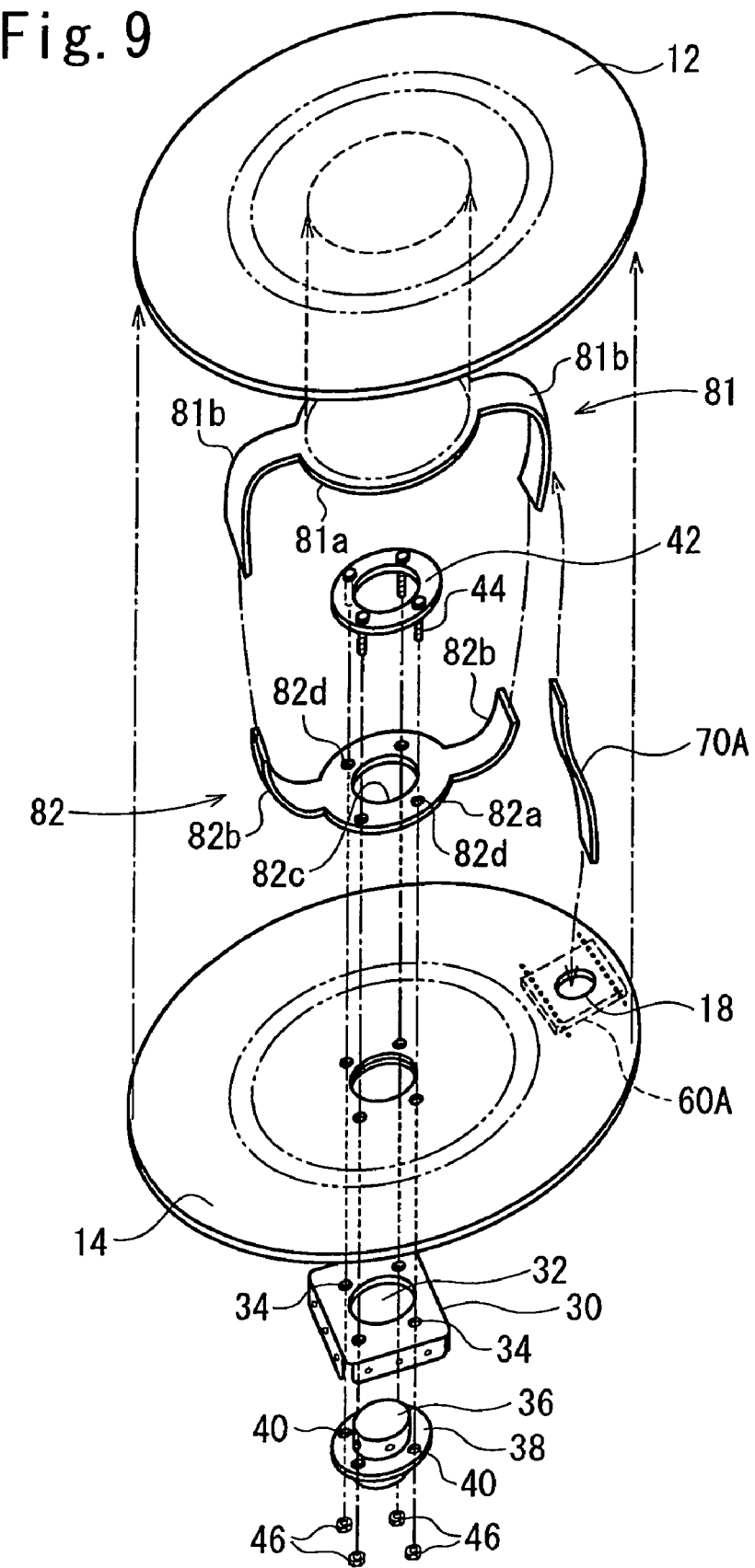
FIG. 9 is an exploded perspective view of the airbag and the airbag device in FIG. 6.
Figure 10:
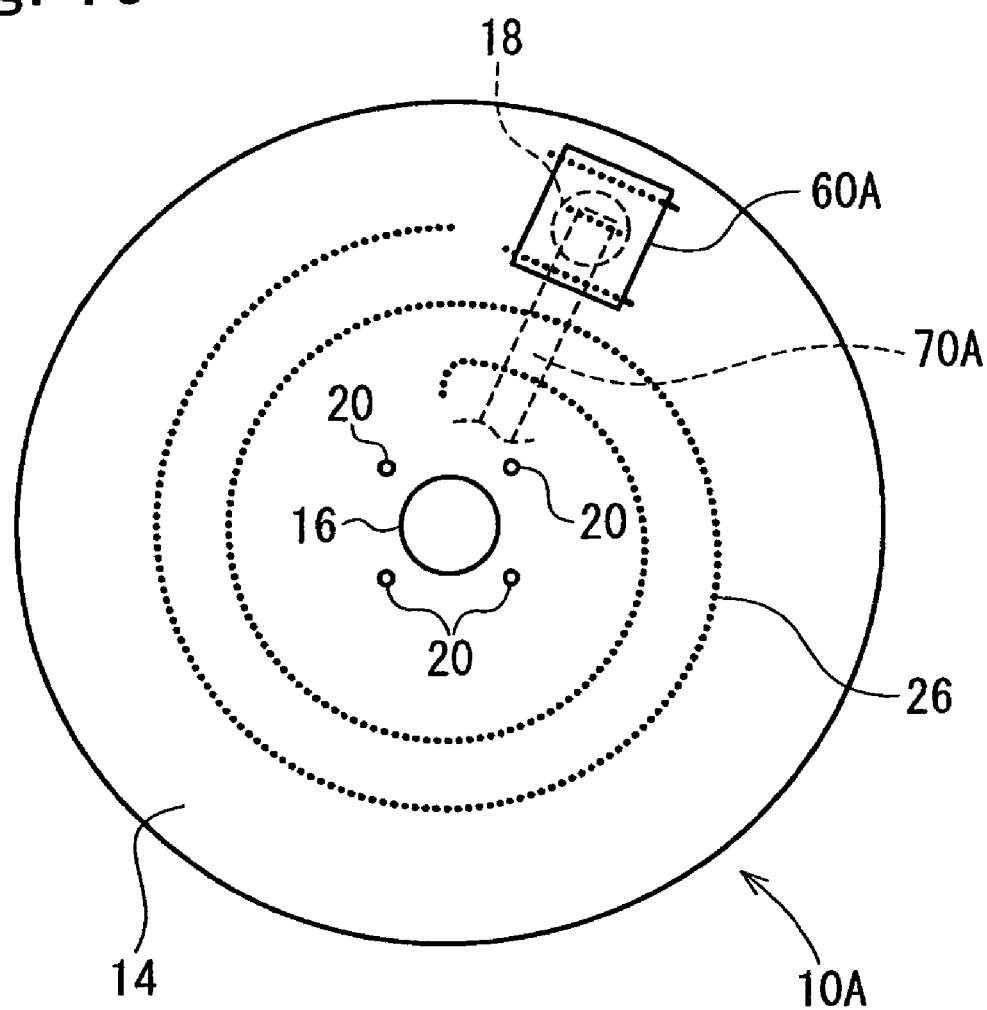
FIG. 10 is a plan view of the airbag in FIG. 6 seen from a rear panel side.

FIG. 6 to FIG. 8 are cross-section views of an airbag and an airbag device configured like this, FIG. 9 is an exploded perspective view of the airbag and airbag device, and FIG. 10 is a plan view of this airbag seen from a rear panel side. Incidentally, FIG. 6 shows a state in which inflation of the airbag is restricted by joining means, FIG. 7 shows a state in which the joining means are broken and an occupant does not get in contact with the airbag yet, and FIG. 8 shows a state in which the occupant comes in contact with the airbag after the joining means have been broken.

An airbag 10A of this embodiment is constituted such that a cover member 60A is disposed along an outer surface of the rear panel 14 in the airbag 10 of FIG. 1 to FIG. 5 described above, and the vent hole 18 is covered with the cover member 60A from the outside of the airbag.

The cover member 60A is composed of a web having a substantially rectangular shape, in this embodiment. Both end portions of the cover member 60A on the outer periphery side of the rear panel 14 and the center side of the rear panel 14 are fixed to the rear panel 14 on the outer periphery side and the center side with respect to the vent hole 18, respectively, by being each sewn with a seam 62.

It is noted that, in this embodiment, a tuck (the reference numeral is omitted) is formed along each of edge portions where the cover member 60A is fixed by being sewn with the seams 62. Because of this, when the cover member 60A is separated from the rear panel 14, it bulges so as to stretch the tucks.

One end of a tether 70A, which serves as a connecting member in this embodiment, is inserted through the vent hole 18 and fixed to the cover member 60A by being sewn with a seam 72 in an area facing the vent hole 18. The other end side of the tether 70A is fixed to an intermediate portion of one side of a hanging rope 80 in the inside of the airbag 10A by being sewn with a seam 71. It is noted that, in this embodiment, the cover member 60A and the hanging rope 80 are connected to each other with one tether 70A.

As shown in FIG. 10, in this embodiment, an area of the rear panel 14 on its outer periphery side of an inflator opening 16 and bolt insertion holes 20 and also on its inner periphery side of the vent hole 18, and an area of the front panel 12 facing this area are joined together with a spiral line-like joining portion 26, which goes around the inflator opening 16 so as to be disengageable. Furthermore, as shown in FIG. 6, an intermediate portion of the tether 70A in its extension direction is sandwiched between the front panel 12 and the rear panel 14, and the front panel 12, the rear panel 14 and an intermediate portion of the tether 70A are joined together with the line-like joining portion 26.

Incidentally, in this embodiment, the line-like joining portion 26 goes around the inflator opening 16 two times, but it may goes around three or more times.

An end portion of the line-like joining portion 26 is a radial direction extension portion (the reference numeral is omitted), which extends toward the center side of the airbag 10A.

The other configuration of this airbag 10A is similar to that of the airbag 10 of FIG. 1 to FIG. 5, and reference numerals in FIG. 6 to FIG. 10 identical to these in FIG. 1 to FIG. 10 denote identical portions.

Also, in the case when the airbag 10A configured like this, since the joint of the front panel 12 and the rear panel 14 with the line-like joining portions 26 is not disengaged until the internal pressure thereof becomes equal or more than predetermined as shown in FIG. 6, inflation in a portion of the airbag 10A on its outer periphery side with respect to the line-like joining portion 26 is restricted. Therefore, the internal pressure of the airbag 10A is quickly increased without using any high-powered one as an inflator 36.

The stresses due to the internal pressure of the airbag 10A concentrate on a radial direction extension portion of the line-like joining portion, the radial direction extension portion being formed in the edge portion on the inner periphery side of the line-like joining portion. Then, when the internal pressure of the airbag 10A becomes equal or more than predetermined, breakage of the line-like joining portion 26 starts from the radial direction extension portion. The breakage of the line-like joining portion 26 advances from its inner periphery side to its outer periphery side.

When the whole of the line-like joining portion 26 is broken, the area of the front panel 12 and the rear panel 14 from the line-like joining portion 26 to the most peripheral portion of the airbag 10A becomes separatable, and as seen in FIG. 7 the airbag 10A is inflated up to its most peripheral portion. Also due to the breakage of the line-like joining portion 26, the joint of both the front panel 12 and the rear panel 14 and the tether 70 is disengaged, and the tether 70 is therefore stretched between the hanging rope 80 and the cover member 60A.

After this, until the occupant P comes in contact with this airbag 10A, the cover member 60A is pulled by the tether 70 to the inside of the airbag 10A and overlaps on the vent hole 18; thereby the vent hole 18 remains in the state of being closed. Because of this, flow out of gas from the vent hole 18 is restricted and the internal pressure of the airbag 10A is maintained to be equal or more than predetermined.

And, in the case when the occupant P comes in contact with this airbag 10A, as shown in FIG. 8, the front panel 12 is pushed by the occupant P to move backward to the side of the rear panel 14; thereby the hanging rope 80 is slackened and the force pulling the cover member 60A to the inside of the airbag 10A is released. Because of this, the cover member 60A is separated from the vent hole 18 by the gas pressure in the airbag 10A, and the vent hole 18 becomes opened. As the result, the gas flows out from the vent hole 18 to the outside of the airbag 10A, and the occupant P is received softly by the airbag 10A.

It is noted that also in the case of the airbag 10A, although not shown in the drawings, when the occupant P comes in contact with this airbag 10A before the internal pressure of the airbag 10A becomes equal or more than predetermined, i.e., before the line-like joining portion 26 is broken, since an intermediate portion of the tether 70A in its extension direction is joined with the front panel 12 and the rear panel 14 by the line-like joining portion 26, the portion of the tether 70A on the side of the cover portion 60A with respect to the line-like joining portion 26 is not slackened, even when the front panel 12 moves backward by being pushed by the occupant P. Accordingly, the vent hole 18 remains to be covered with the cover member 60A. For this reason, the gas does not flow out from the vent hole 18 to the outside of the airbag 10A and the internal pressure in the airbag 10A does not decrease, so the occupant P is restrained by this airbag 10A.

After this, when the internal pressure in the airbag 10A becomes equal or more than predetermined, the line-like joining portion 26 is broken. At this time, since the front panel 12 is already in a state of being moved backward by being pushed by the occupant P, the hanging rope 80 and the tether 70A are not stretched, the cover member 60A is immediately separated from the vent hole 18 by the gas pressure in the airbag 10A, and the vent hole 18 becomes opened. Because of this, the gas flows out from the vent hole 18 to the outside of the airbag 10A, and the occupant P is received softly by the airbag 10A.

Each of embodiments described above is an example of the present invention, and the present invention is not limited to the above embodiments.

In the present invention, a cover member may be configured so as to cover a vent hole partially until an airbag is inflated equally or more than predetermined, and to make the vent hole opened to a large extent when the airbag is inflated equally or more than predetermined.

Although a vent hole is configured to be a circular opening in each of the above embodiments, the shape of the vent hole is not limited to this, and it is possible to be configured in a variety of shapes such as a slit-like shape or the like.

Although an airbag is provided with only one vent hole in each of the above embodiments, it may be provided with two or more.

Likewise, in the present invention, besides the vent hole which is provided with a cover member, there may be provided a normally-opened type vent hole, which remains in a state of being open all the times.

Although a hanging rope 80 is provided as an internal member in each of the above embodiments, there may be provided an internal member configured differently from this, for example, an internal panel, which partitions the inside of an airbag into a first central chamber and a second chamber surrounding it, or the like. Or, without using such an internal member as medium, connecting members, i.e., tethers 70, 70A may be connected directly to an occupant-facing surface of the airbag, i.e., a front panel 12. In this case, the internal member may be omitted.

Although each of the embodiments described above shows an example in which the present invention is applied to an airbag and an airbag device for a driver's seat of a vehicle, the present invention is applicable to an airbag and an airbag device for other than a driver's seat.

The invention claimed is:

1. An airbag comprising:
a vent hole provided in a distal-to-occupant side face on the other side of an occupant-facing face, or in a side face of the airbag in a state of being inflated;
a cover member covering the vent hole; and
a connecting member connecting the cover member and the occupant-facing face, passing though the inside of the airbag,
wherein the occupant-facing face and the distal-to-occupant side face are joined together with a joining body on the center side of the airbag relative to the vent hole so as to be disengageable;
an intermediate portion of the connecting member in its extension direction is sandwiched between the occupant-facing face and the distal-to-occupant side face, while being joined to both the occupant-facing face and the distal-to-occupant side face with the joining body;
the joint of the occupant-facing face, the distal-to-occupant side face and the connecting member with the joining body is disengaged when internal pressure of the airbag becomes equal or more than predetermined;
after this, until an occupant comes in contact with this airbag, the cover member is prevented by the connecting member to move to the outside of the airbag and overlaps on the vent hole, and thereby the vent hole remains closed or is made open to a small extent; and
when the occupant comes in contact with this airbag and the occupant-facing face is moved backward, the cover member is separated from the vent hole by gas pressure in the airbag and thereby the vent hole becomes opened or is made open to a large extent;
wherein the cover member covers the vent hole from the inside of the airbag;
an inserting-through portion for the connecting member is provided on the inner surface of the airbag in the distal-to-occupant side face or the side face;
one end side of the connecting member is connected to the occupant-facing face, an intermediate portion of the connecting member is inserted through the inserting-through portion, and the other end side of the connecting member is connected to one end of the cover member; and
an end portion of the cover member on the side opposite to the connecting member across the vent hole.

2. The airbag according to claim 1,
wherein an opening for use with an inflator is provided in the vicinity of the center of the distal-to-occupant side face of the airbag, and the occupant-facing face and the distal-to-occupant side face are joined together with the joining body provided between the opening and the vent hole to extend in substantially an annular shape or a spiral shape so as to go around the opening.

3. The airbag according to claim 1,
wherein the joining body is a tear seam.

4. An airbag device comprising:
an airbag of claim 1;
an inflator for supplying gas to the airbag;
a retainer to which the airbag is mounted; and
a fixing member for fixing the airbag to the retainer.

5. An airbag comprising:
a vent hole provided in a distal-to-occupant side face on the other side of an occupant-facing face, or in a side face of the airbag in a state of being inflated;
a cover member covering the vent hole; and a connecting member connecting the cover member and the occupant-facing face, passing though the inside of the airbag, wherein the occupant-facing face and the distal-to-occupant side face are joined together with a joining body on the center side of the airbag relative to the vent hole so as to be disengageable;

an intermediate portion of the connecting member in its extension direction is sandwiched between the occupant-facing face and the distal-to-occupant side face, while being joined to both the occupant-facing face and the distal-to-occupant side face with the joining body;

the joint of the occupant-facing face, the distal-to-occupant side face and the connecting member with the joining body is disengaged when internal pressure of the airbag becomes equal or more than predetermined;

after this, until an occupant comes in contact with this airbag, the cover member is prevented by the connecting member to move to the outside of the airbag and overlaps on the vent hole, and thereby the vent hole remains closed or is made open to a small extent; and when the occupant comes in contact with this airbag and the occupant-facing face is moved backward, the cover member is separated from the vent hole by the gas pressure in the airbag and thereby the vent hole becomes opened or is made open to a large extent, and wherein the cover member covers the vent hole from the outside of the airbag, and the connecting member passes through the vent hole and across the inside of the airbag to connect the cover member to the occupant-facing face.

6. An airbag comprising:

a vent hole provided in a distal-to-occupant side face on the other side of an occupant-facing face, or in a side face of the airbag in a state of being inflated;

a cover member covering the vent hole; and a connecting member connecting the cover member and the occupant-facing face, passing though the inside of the airbag, wherein the occupant-facing face and the distal-to-occupant side face are joined together with a joining body on the center side of the airbag relative to the vent hole so as to be disengageable;

an intermediate portion of the connecting member in its extension direction is sandwiched between the occupant-facing face and the distal-to-occupant side face, while being joined to both the occupant-facing face and the distal-to-occupant side face with the joining body;

the joint of the occupant-facing face, the distal-to-occupant side face and the connecting member with the joining body is disengaged when internal pressure of the airbag becomes equal or more than predetermined;

after this, until an occupant comes in contact with this airbag, the cover member is prevented by the connecting member to move to the outside of the airbag and overlaps on the vent hole, and thereby the vent hole remains closed or is made open to a small extent; and when the occupant comes in contact with this airbag and the occupant-facing face is moved backward, the cover member is separated from the vent hole by gas pressure in the airbag and thereby the vent hole becomes opened or is made open to a large extent, and wherein an internal member connecting the occupant-facing face and the distal-to-occupant side face of the airbag in a state of being inflated is provided in the airbag, and the connecting member is connected to the internal member.

* * * * *